Patented Apr. 26, 1932

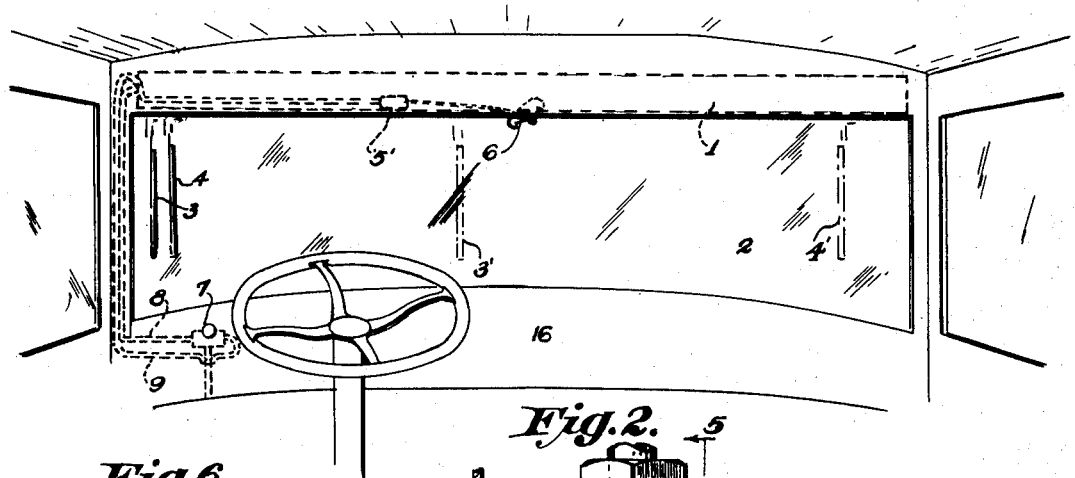

1,855,913

UNITED STATES PATENT OFFICE

HENRY HUEBER, OF BUFFALO, AND ERWIN C. HORTON, OF HAMBURG, NEW YORK, ASSIGNORS TO TRICO PRODUCTS CORPORATION, OF BUFFALO, NEW YORK

WINDSHIELD CLEANER CONTROL

Application filed May 14, 1928. Serial No. 277,600.

This invention relates to windshield cleaners and more especially to a control valve for the same, and it is primarily adapted for the control and operation of windshield cleaners of the type disclosed in the patent for automatic windshield cleaners, No. 1,716,135, granted to Henry Hueber on June 4, 1929.

In the type of cleaner just referred to there is provided a cylinder which is reciprocated back and forth by means of suction and carries a plurality of wipers relatively adjustable for cleaning the windshield partially or as an entirety. To effect the adjustment of one wiper relative to the other there is provided a latch or detent which is designed to arrest one of the wipers and hold it immovable while the cylinder is moving with the companion wiper to effect a desired spacing of the wipers, and after the desired spacing has been obtained the arrested wiper is then released so that the wipers will move in unison with the cylinder in their newly spaced relation. The latch or detent is preferably operated by an auxiliary suction-operated motor of the single acting type. The windshield cleaner is controlled by a valve arranged on the instrument board of the automobile, there being two fluid connections between the control valve and the windshield cleaner, one being the cleaner operating passage and the other the detent control passage, and by the proper manipulation of this control valve the spaced cleaners may be moved from a parked position at the left side of the windshield, where they are usually parked in close relation with each other, to a position toward the center of the windshield at which time the detent is brought into operation to arrest one of the wipers against retrograde movement while permitting the companion wiper to have such movement, and then permit movement of the arrested wiper with the companion wiper upon the start of a new movement thereof.

The present invention has for its primary object to improve the control for this type of cleaner by which the operation of the cleaner may be readily effected and properly controlled in a certain and expeditious manner.

The invention also has for its objects to simplify the construction of the control valve; to provide a control valve which may be economically manufactured and easily assembled; and to provide a control valve which will possess an ease of manipulation which will adapt itself for the efficient operation and control of a windshield cleaner of the type above set forth.

With reference to the accompanying drawings,

Fig. 1 is a more or less schematic showing illustrating a windshield equipped with a windshield cleaner of the type above referred to, and indicating by dotted lines the fluid connections leading to the control valve on the instrument board, Fig. 2 is a fragmentary top plan view of the valve as mounted on the instrument board, Fig. 3 is a vertical, longitudinal section through the improved control valve illustrating the same in its cleaner-operating position, Fig. 4 is a fragmentary, sectional view illustrating the valve in its wiper-parking position, Fig. 5 is a transverse, fragmental sectional view about on line 5—5 of Fig. 2, portions being in elevation, and Fig. 6 is a detailed perspective view showing the slide member parts of the valve disassembled.

Referring more in detail to the accompanying drawings, the numeral 1 indicates the windshield cleaner mounted at the forward side of the windshield 2 and embodying a pair of wipers 3 and 4 illustrated as being parked to the left side of the driver. The windshield cleaner, in addition to the main wiper-operating motor, embodies an auxiliary single-acting motor 5 having a piston therein spring-pressed in one direction to normally hold the latch or detent 6 in the position indicated in Fig. 1. The control valve 7 arranged on the instrument board, or in some other convenient location, is connected with a cleaner-operating passage 8 and a parking passage 9, the former passage leading to the valve mechanism (not shown) of the windshield cleaner motor while the parking passage 9 leads to the auxiliary motor 5 for moving its piston against the action of its spring so as to tilt or rock the latch 6 to a position where it will arrest the wiper 4 against movement to the right side of the windshield but permit movement thereof to the left along with the wiper 3 for the purpose of parking both wipers to the left side of the windshield, or to permit the two wipers to act conjointly in clearing the left side of the windshield.

The control valve comprises a block 10 having a valve seat 11 on a slightly raised pad 11' and in which opens a port 12 connectible to the intake manifold or other source of suction, a port 13 connectible to the valve mechanism of the windshield cleaner, and a port 14 connectible to the latch-operating motor 5. The valve block 10 is provided at one side with a tubular anchoring part 15 which is preferably designed for being inserted through a hole in the instrument board 16 and receives a nut 17 by which the valve may be conveniently mounted to the back of the instrument board.

The valve herein depicted embodies a slide member 18 which has sliding engagement with the seat 11 and has its rear end guided and steadied by a stud bolt 19 threaded into the valve block, the forward end of the valve being reduced and extending through the tubular anchoring part 15 of the block where it is equipped with a knob 20 whereby the slide member may be operated over its seat. The rear end of the slide member is provided with a slot or port 21 to guidingly receive the pin or bolt 19, and forward from this slot is provided a slot or port 22 adapted to operatively connect the ports opening through the valve seat. The slide member is preferably flat and the slot 22 is conveniently formed by punching or cutting out the entire thickness of the body of the slide, which greatly facilitates the manufacture of the valve slide. This produces a strap-like body in which the ports extend therethrough. The port 22 is preferably closed on its upper side by surmounting on the slide member a leather packing 23 which is held against relative movement on, or displacing movement from the slide, by a keeper 24 which has depending fingers 25 for interlocking with lateral shoulders 26 provided on the slide member as well as with registering shoulders 27 formed on the packing member 23.

To hold the slide member in firm engagement with its seat, and also to secure the packing member 23 and its cap or keeper plate 24 against displacing movement, there is provided a retention member in the form of a spring 28, preferably a leaf spring, having one end interlocked beneath the shoulder 29 at the inner end of the tubular anchoring part 15, and its opposite end engaged beneath the head of the bolt 19. Obviously, by adjusting the bolt the spring tension exerted on the valve parts may be adjusted. Intermediate its ends the leaf spring is provided with a downwardly pressed detent 30 for riding on the upper side of the plate 24 and into and out of the recess 31 therein. The recess 31 is so located as to receive the detent 30 when the slide member is disposed in the intermediate one of three positions, such as is indicated in Fig. 4, movement of the composite valve slide in either direction therefrom will bring the recess from beneath the detent 30 and thereby provide a means by which the relative position of the valve may be approximately determined.

The shoulder 29 is provided with rearwardly flaring walls 29' with which engage converging walls 32, the latter co-acting with said flaring walls 29' so as to center and steady the slide member when the latter is fully withdrawn, as indicated in Figs. 2 and 3, in which position it will be noted that the slide member is retracted almost entirely from the guide member 19 and, therefore, the forward guiding and steady action accorded by the cooperating shoulders 29' and 32 materially assist in securing the slide member against lateral play when the same is in its normal operating position.

In the operation of the windshield cleaner, the slide member may be withdrawn from a fully closed or innermost position either to a position in which the detent 30 drops into the recess or hole 31, as indicated in Fig. 4, or to a fully open position. In the intermediate position the two wipers will begin their travel from the parked position indicated in Fig. 1 toward the center of the windshield, and simultaneous with their rightward movement the latch 6 will be tilted to the opposite position from that shown in Fig. 1 so as not to arrest the wiper 4 from movement with the wiper 3 in close relation therewith. This close formation of the two wipers is especially desired for unusual adverse driving conditions, such as during a wet snow, the two wipers reciprocating on the left side of the windshield so as to provide a cleared zone immediately in front of the driver of the vehicle.

When it is desired to operate the wipers in spaced relation, such as is indicated at 3' and 4', the slide member is fully withdrawn to the position indicated in Fig. 3 whereupon the parking port 14 is vented to the atmosphere through the atmospheric port 21 for permitting the latch 6 to return to the position indicated in Fig. 1 so that the wiper 4 will be arrested at the center until the wiper 3 has moved its full extent leftward whereupon the two wipers will thereafter reciprocate in spaced relation as indicated. When it is desired to again park the wipers, or to operate the same in close formation, the slide member is again moved to its central position, which may be indicated by the "feel" of the detent 30 entering the hole 31, whereupon the parking port 14 will be opened to the suction along with the cleaner port 13 to tilt the latch 6 in the opposite direction and arrest the wiper 4 against movement toward the right side of the windshield while permitting movement thereof to the left side along with the wiper 3. After the close formation is obtained, and it is desired to park the wipers to the position indicated by the solid lines in Fig. 1, the slide member is pushed to its innermost position, as indicated by the dotted showing in Fig. 4. In this position it will be noted that the two ports 13 and 14 are open to the atmosphere. by reason of the spacing of the slide member by the raised pad 11' from the valve block whereby atmospheric air may enter beneath the overhanging slide member into the two ports 13 and 14. This arrangement renders the force of any suction which may escape beneath the slide member over the wall intervening the ports 12 and 13 nil on the cleaner and the detent cylinder. Consequently, there will be no creeping of the wiper blades into the field of vision through the windshield after the suction line has once been closed.

What is claimed is:

1. A control for suction-operated devices comprising a valve block having a flat valve seat through which open a plurality of ports, a slide member slidable on the seat and having an opening in its seat-engaging side for operatively connecting said ports, the opening extending through to the opposite side of said slide member, a closure member for closing the opening at said opposite side of said slide member and displaceably mounted thereon, and a leaf spring anchored at its opposite ends and having its intermediate portion bearing on said closure member for functioning in a dual capacity to retain said closure member operative and to yieldingly press said slide member to its seat.

2. A control for suction-operated vehicle attachments, comprising a valve block having a flat valve seat through which open a plurality of ports, a slide member slidable on the seat and having a port-connecting opening extending therethrough, a closure for the opening of said slide member displaceably mounted thereon, said closure having a depression, a leaf spring anchored at its opposite ends and having its intermediate portion bearing on said closure member for retaining said closure member operative and for yieldingly pressing said slide member to its seat, said leaf spring having a part receivable by the depression of said closure member for yieldably holding the slide member against movement and yieldable outwardly to permit movement of said slide member in either direction therefrom.

3. A control for suction-operated automobile accessories comprising a valve block having one end formed for attachment to a support, a guide member on the opposite end of said block, said block being formed intermediate its ends with a flat valve seat through which open ports, a flat slide member having a handle part at one end extending through the anchored end of said valve block, the opposite end of said slide member being bifurcated to guidingly co-act with said guide member for guiding said valve in its movement on said seat, said slide member having a port for operatively connecting the ports of said seat, and a leaf spring detachably anchored to said valve block at its opposite ends and having its intermediate portion bearing on said slide member for yieldably pressing the same to its seat.

4. A control for suction-operated automobile accessories comprising a valve block having a tubular portion at one end exteriorly threaded for being passed through a support and anchored thereto, means for clamping said anchor portion to a support, said valve block having a flat valve seat through which open ports, a slide member having an operating part projecting through the tubular anchor portion to the opposite side of an engaged support, said slide member being slidable on said flat valve seat and having a port for operatively connecting said ports, a guide bolt arranged on said valve block beyond said valve seat, said slide member having parts straddling said bolt to guide said slide member in its movement on the valve seat, and a leaf spring having one end entering said tubular anchor portion and its opposite end secured against upward displacement by said bolt, the intermediate portion of said spring having sliding support on said slide member for yieldably pressing the latter to its seat.

5. A control for suction-operated automobile accessories comprising a valve block having a flat valve seat through which open ports, a slide member slidable on said valve seat and having a port for operatively connecting said ports, and a leaf spring having its opposite ends interlocking with said valve block and its intermediate portion provided with a detent, and said slide member being provided with a recess yieldably receiving the detent in one position of the valve, said detent yielding outwardly to permit shifting of the valve to another position.

6. A control for suction-operated automobile accessories comprising a valve block having a valve seat through which ports open, a flat slide member engaging said seat and having spaced slots therethrough, one of said slots acting to operatively connect said ports, a part on said valve block extending into the companion slot for guiding the slide member in its movement on the valve seat, a closure plate for the first slot seating on said slide member and extending over said first slot to close the same at the adjacent side of said slide member, and means bearing on said closure plate and acting to yieldably press said slide member to its seat.

7. A control for suction-operated automobile accessory devices comprising a valve block having a valve seat provided with a suction supply port, a parking port, and an accessory operating port arranged between the first two ports, and a valve member having a port for operatively and selectively connecting two or all of said ports, said valve member having an atmospheric port for venting said parking port when the other two ports are operatively connected.

8. A control for suction-operated automobile accessory devices comprising a valve block having a valve seat provided with a suction supply port, a parking port, and an accessory operating port, a slide member engaging the valve seat and having an opening for selectively connecting two or all of said ports, said slide member having an atmospheric port for venting said parking port when the other two ports are connected by said slide member opening, said slide member opening extending through the slide member to the opposite side thereof, a closure plate seating on said opposite side of the slide member and over said opening therein for closing the same at that side thereof, and means resiliently pressing said closure plate on said slide member and exerting pressure to hold said slide member engaged with its seat.

9. A control for suction-operated automobile accessory devices comprising a valve block having a valve seat provided with a suction supply port, a parking port, and an accessory operating port arranged between the first two ports, a slide member engaged on said valve seat and having spaced openings therethrough, one of said openings acting to operatively and selectively connect two or all of said ports and the companion opening acting to vent the parking port when said first opening is operatively connecting the other two ports, a closure plate freely seated on the slide member opposite to the valve seat and over the first opening therein for closing the same at that side thereof, and means holding said closure plate and said slide member in their operative positions.

10. A control for suction-operated automobile accessory devices comprising a valve block having a valve seat, a slide member movable on said valve seat and having an opening therethrough, a closure plate arranged over said opening of the slide member and interlocking with the latter against longitudinal displacement during shifting of the valve on its seat, said closure plate being displaceable by lifting from said slide member, and means maintaining the interlocked relation between the closure plate and the slide member and acting to urge the latter to its seat.

11. A control for suction-operated automobile accessory devices comprising a valve block having a valve seat, a slide member movable on said valve seat and having an opening therethrough, a packing member seated on the slide member over the opening therein, a retaining plate arranged on the packing member and interlocking with the slide member for holding the packing member in place, and spring means exerting pressure on the retaining plate to hold it in position and to urge the slide member to its seat.

12. A control for suction-operated automobile accessory devices comprising a body having a valve seat, provided with a suction supply port, a parking port, an accessory operating port arranged between the first two ports, a slide member engaged on said valve seat and having spaced openings therethrough, one of said openings acting to operatively and selectively connect two or all of said ports and the companion opening acting to vent the parking port when said first opening is operatively connecting the other two ports, a packing member seated on the slide member over the first opening therein, a retaining plate arranged on the packing member and interlocking with the slide member for holding the packing member in place, a guide part carried by the body and extending upwardly through said companion opening of the slide member, and a leaf spring interlocked at one end with said guide part and at the opposite end with said body and extending over said retaining plate in bearing relation therewith for yieldably holding the retaining plate against displacement and the slide member on its seat.

13. A control for suction-operated accessories comprising a valve block having a plurality of ports opening through a face thereof which constitutes a valve seat, a valve slidable on the seat for operatively connecting the ports, and a stationarily mounted leaf spring supported at its opposite ends and having an intermediate portion bearing on the valve and yieldably pressing the same to its seat, said intermediate portion being provided with means for interrupting movement of said valve.

14. A control for a suction-operated windshield cleaner embodying a plurality of wipers which are variably spaced by the cooperation of an auxiliary suction-operated device, said control comprising a valve block having a valve seat provided with a suction supply port a parking port connectible to the auxiliary suction-operated device, and a windshield cleaner operating port arranged between the first two ports, and a slide member movable on the valve seat to three positions and having spaced passages therein, one of said passages adapted to connect all of said ports together when the slide member is in its intermediate position, said slide member being movable to another position to connect the suction supply port to the windshield cleaner operating port, and when the slide member is in the latter position the companion passage thereof venting said parking port to the atmosphere, and said slide member being movable to a third position for closing said suction supply port and opening the remaining two ports to the atmosphere.

15. A control for suction operated automobile accessories comprising a valve block having a valve seat through which open ports, a slide member slidable on said valve seat and having a port for operatively connecting said ports, a leaf spring having one end detachably interlocked with said valve block and its intermediate portion bearing on said slide member for yieldably pressing the latter to its seat, and means engaging the opposite end of the spring for adjusting the pressure of the spring and said slide member and for maintaining the interlocked relationship between said valve block and the first end of the spring.

HENRY HUEBER.
ERWIN C. HORTON.